Oct. 18, 1938.  C. G. ABBOT  2,133,649
SOLAR HEATER
Filed March 27, 1935  4 Sheets-Sheet 1
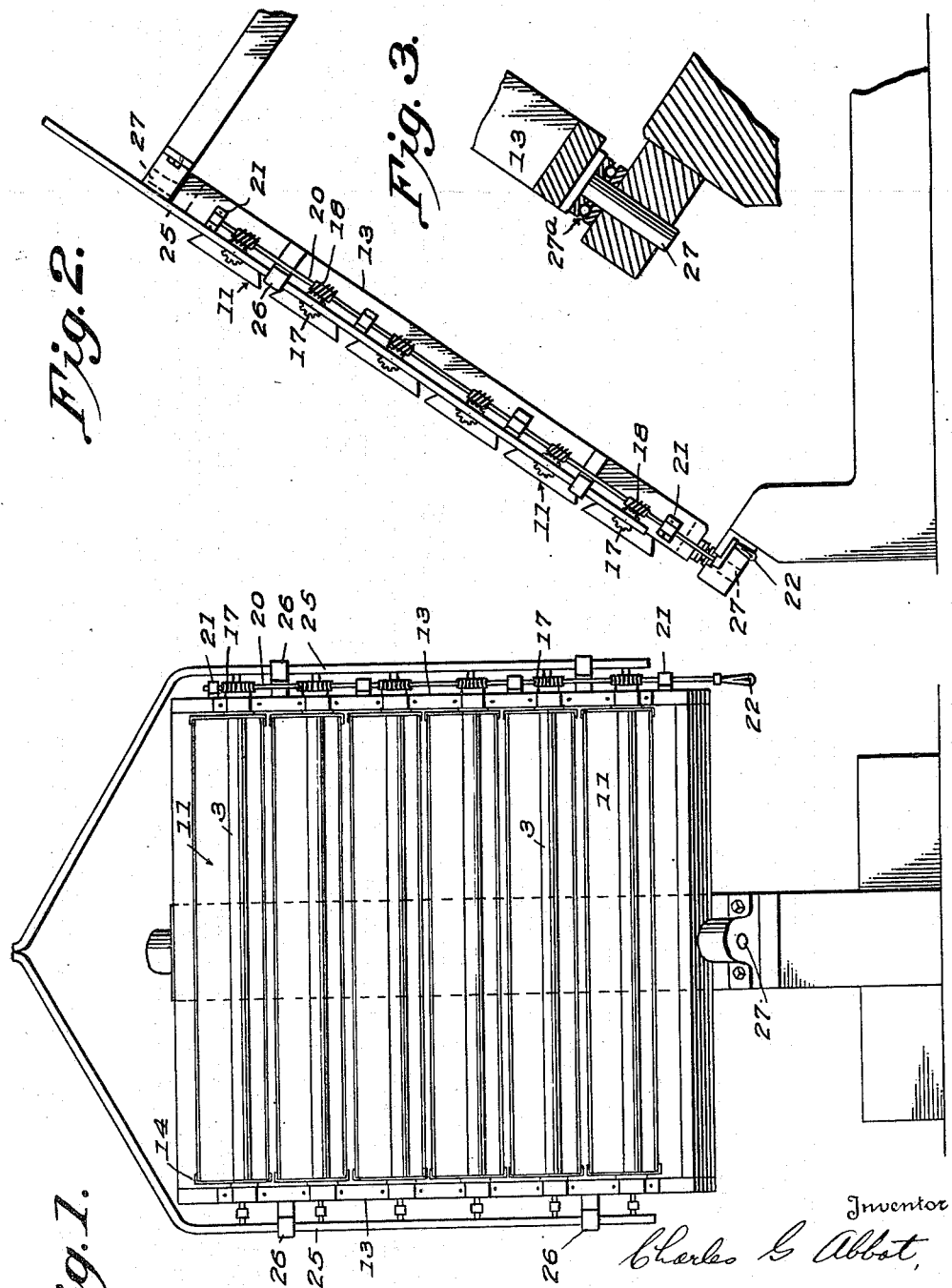
Inventor
Charles G. Abbot,
By Dorsey & Cole
Attorneys

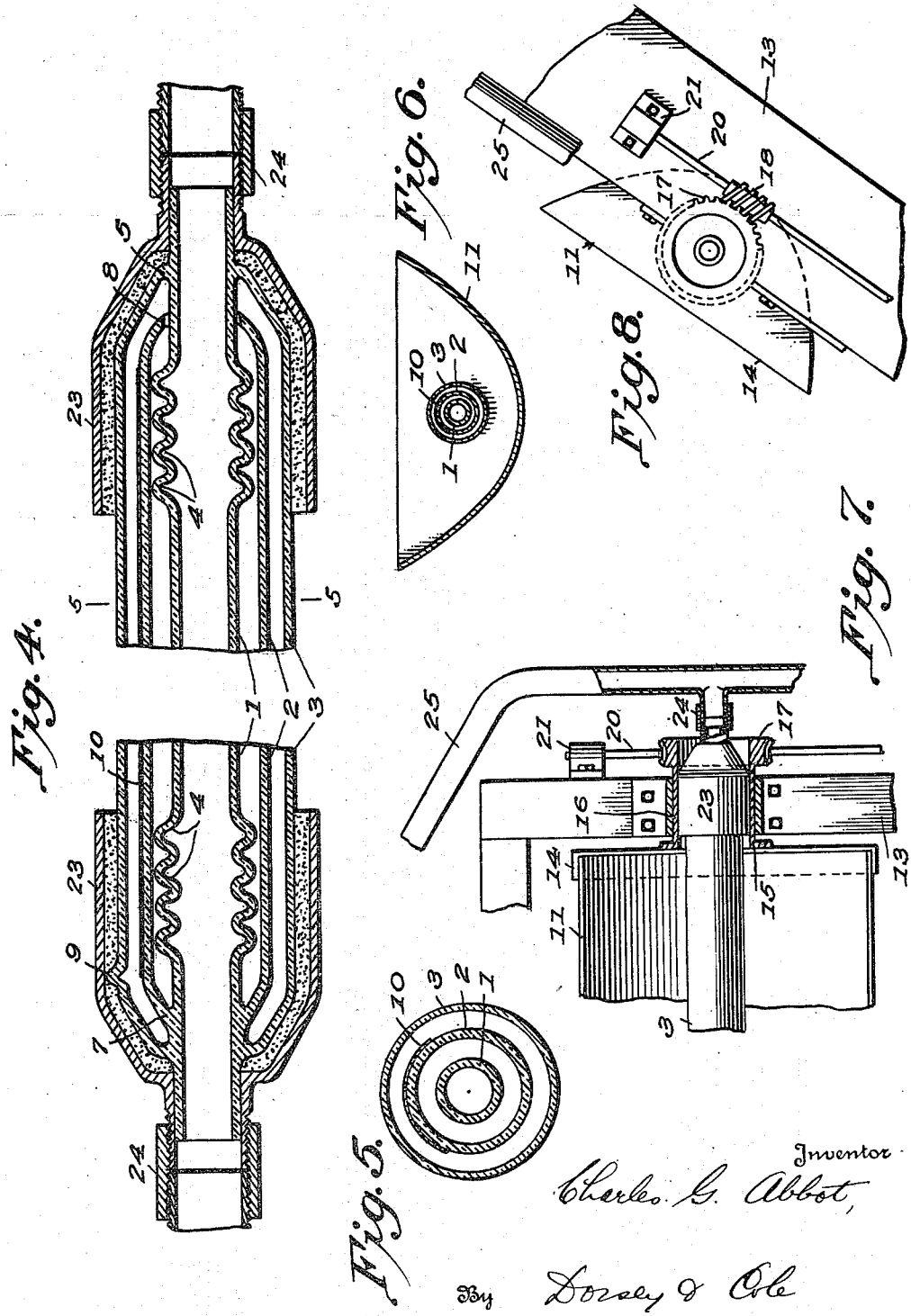

Oct. 18, 1938.  C. G. ABBOT  2,133,649
SOLAR HEATER
Filed March 27, 1935   4 Sheets-Sheet 3
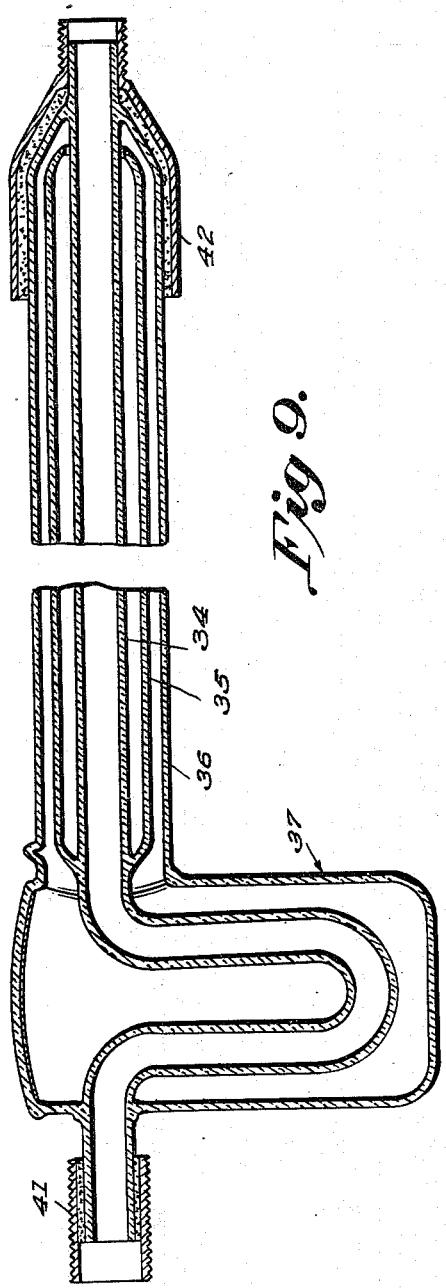
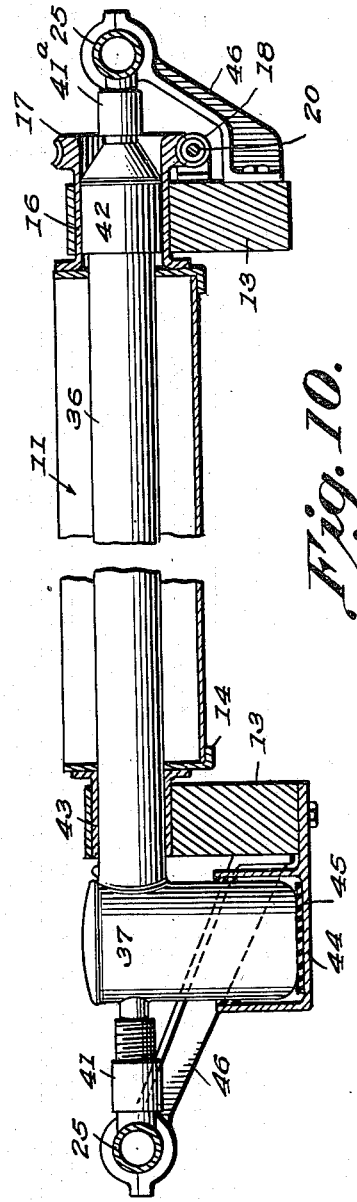
Inventor
Charles G. Abbot,
By Dorsey & Cole
Attorneys Oct. 18, 1938.  C. G. ABBOT  2,133,649
SOLAR HEATER
Filed March 27, 1935  4 Sheets-Sheet 4
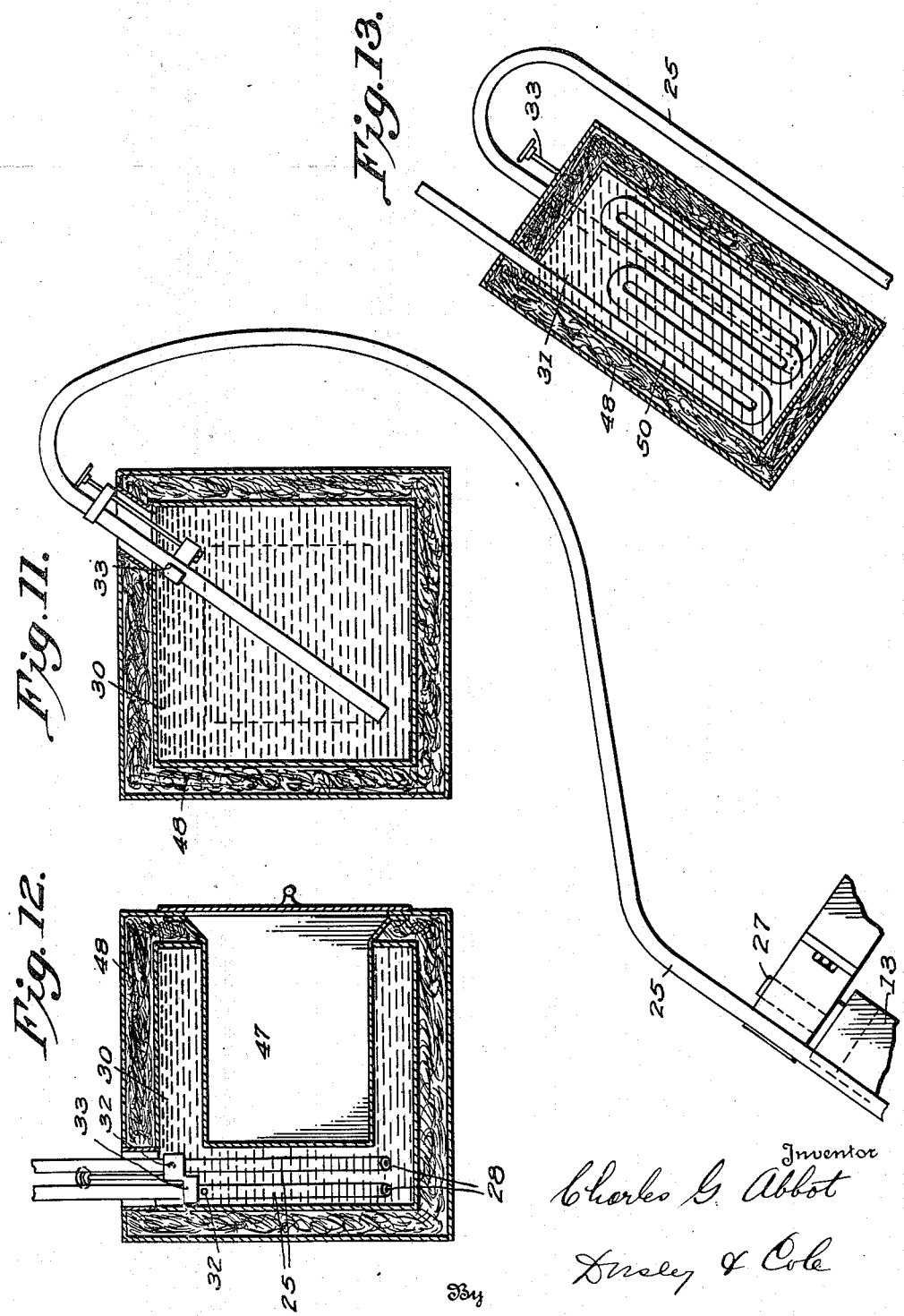

Patented Oct. 18, 1938

2,133,649

UNITED STATES PATENT OFFICE 2,133,649

SOLAR HEATER

Charles Greeley Abbot, Washington, D. C.

Application March 27, 1935, Serial No. 13,332

13 Claims. (Cl. 126—271)

This invention relates to apparatus for absorbing the heat of solar radiation and for rendering it useful for various purposes, as cooking or evaporation, and may also be employed for the production of power in steam engines. The structures shown herein have for their objects the provision of economical and efficient means for concentrating the rays of the sun from large areas of exposure onto small ray-absorptive instrumentalities arranged in a manner to serve as heat collecting units for servicing those devices which are to utilize such heat.

A frame or unit carrying a series of reflectors is provided, there being associated with each reflector ray-absorptive means which produce a heating effect upon a fluid to be delivered to the device to be heated. The reflectors are adjustable simultaneously and to the same extent about their longitudinal axes in order to provide for the most efficient reception of the sun's rays. The supporting frame, carrying the reflectors and their associated mechanism, is arranged for orientation so as to adjust the heat receiving units to the proper position and preferably to a position in which the longitudinal axes of the heat receiving units are at right angles to the rays of the sun.

A more detailed description of the invention will hereinafter appear and reference will be made to the accompanying drawings, in which corresponding parts are designated by corresponding marks of reference.

Figure 1 is a front elevation illustrating a frame carrying a plurality of ray-collecting and ray-absorbing units.

Figure 2 is a side view of the structure illustrated in Figure 1.

Figure 3 is a detailed view showing one of the trunnion bearings which serves for the orientation of the frame carrying the plurality of ray-collecting and ray-absorbing units.

Figure 4 illustrates in longitudinal section one form of a ray-absorbing unit.

Figure 5 is a section on the line 5—5 of Figure 4.

Figure 6 is a transverse section through a ray-reflecting and ray-absorbing unit and the disposition of the latter in the line focus of the ray-reflecting unit.

Figure 7 is a view partly in section showing the end mounting and connections of a ray-reflecting and ray-absorbing unit.

Figure 8 is a detailed end view showing the means by which the ray-reflecting unit is adjusted.

Figure 9 is a longitudinal section illustrating another form of ray-absorbing unit.

Figure 10 is a side view partly in section illustrating the method of mounting the ray-absorbing unit of Figure 9.

Figure 11 is a diagrammatic view illustrating the connections by which the heating fluid is transmitted to an oven.

Figure 12 is a view of the oven and the pipes leading thereto, taken at right angles to Figure 11.

Figure 13 is a diagrammatic view illustrating the delivery of the heating fluid to a steam boiler.

Referring to Figures 4 and 5, 1, 2 and 3 are transparent tubes, preferably each about six feet long and of glass of low heat expansibility, high transparency for waves between 3,000 and 30,000 angstroms, low transparency for waves exceeding 40,000 angstroms, and of high reflecting power for waves exceeding 40,000 angstroms. The glass produced by the Corning Glass Works of Corning, N. Y., called "Pyrex No. 774" meets these specifications approximately, and I am accustomed to use it in my constructions. However, I do not limit myself to this particular material. Most glasses, indeed, are highly transparent to most solar radiation, over 90 per cent of the energy of whose waves lies between 3,000 and 30,000 angstroms. At the same time they are highly opaque to waves exceeding 40,000 angstroms such as carry away heat from bodies at moderate temperatures. But few of them combine with these suitable qualities also desirably low heat expansibility. Pure silica glass might indeed be even preferable for my purpose to Pyrex, but is at present more costly. These three tubes are sealed together in a manner described below.

The tube 1, preferably about one half inch in outside diameter, and of about 3/64 inch wall thickness, has a plurality, for example 15 to 20, bellows-shaped enlargements, as shown at 4, Figure 4, adapted to allow for a differential expansion as great as $\frac{1}{16}$ inch or more between the tubes 1, 2, 3. I may also provide for differential expansion by sealing into tube 1 a metal expansion member or a goose neck construction as shown in Figure 9.

Tubes 1 and 3 are hermetically sealed together by fusion at points 5, Figure 4. The tube 2 is fused to tube 1 at point 7, but slips freely upon it at point 8. By means of a tubulure 9, the space between tubes 2 and 3 and tube 1 is highly exhausted to a pressure less than 0.001 millimeter of mercury while the tubes are being held at a high temperature, so that gaseous convection of heat between the three tubes is greatly reduced. The tubulure 9, is sealed hermetically after this operation is completed.

Referring to Figure 5, the upper part of tube 2 is coated on the outside throughout that part of its length lying within tube 3 with a bright metal film 10, extending in width over about one third of its circumference. Such a film is of exceedingly low radiating power for waves exceeding 40,000 angstroms in length. The tube 1, and connecting tubes attached thereto, to be described, is filled with oil or other fluid of high boiling or flashing point, and very opaque to waves between 3,000 and 30,000 angstroms.

It will be apparent that solar rays which lie almost wholly between wave lengths 3,000 and 30,000 angstroms, if they be concentrated upon tube 1, passing through tube 3 and that part of tube 2 not covered by the metal film, will be largely absorbed in the opaque fluid within tube 1, raising its temperature. Heat thus produced in tube 1 can escape almost alone by radiation of wave lengths exceeding 40,000 angstroms. These rays will be stopped by tube 2 which will be warmed by them. Tube 2 in its turn can cool almost alone by radiation, and its radiative power is greatly diminished by the metal film 10. Radiations absorbed in tube 3 produce a moderate rise of temperature there, and heat flows away from tube 3 mainly by convection. The combination of tubes 1, 2, 3 and film 10 is so effective a hindrance to the escape of heat that the oil in tube 1 may reach a temperature fully 200° centigrade above the temperature of the surrounding atmosphere, without an excessive loss of heat from tube 3.

The ray-collecting unit 11, shown in Figure 6, is a cylindric mirror of parabolic cross-section, preferably about nine inches or more wide, and about six feet long. While it may be made otherwise, I prefer for this mirror a highly polished stainless steel or a specially coated aluminum, reflecting 80 per cent or more of solar radiation. The mirror 11, is mounted on trunnions in line with its focus and with tube 1, and provided with mechanism, presently to be described, whereby the mirror 11, may be rotated so as to adjust the focus of the solar rays to fall upon tube 1.

Referring to Figures 1 and 2, a plurality of associated ray-absorbing and ray-collecting units, assembled as in Figures 6 and 7 are mounted upon a frame 13.

Each end of the ray-reflecting unit or mirror 11 is carried by a support 14 to which is attached a hollow trunnion 15, carried in suitable bearings 16 on the frame 13. The trunion 15 is connected to a worm wheel 17 which is rotated by a worm 18 fast on a shaft 20, carried in suitable bearings 21 on the frame 13.

A crank 22 is fast to one end of the shaft 20 for rotation thereof. The tooth relation of the worm and worm wheels for each of the ray-reflecting units 11 will be identical so that upon the rotation of the crank 22 a simultaneous and identical adjustment will be made of all of the ray-reflecting units carried by the frame.

Each end of the transparent tubes 1 and 3 is fastened to a metal tubular adapter 23, see Fig. 4, affixed thereto with a cement, not attacked by the hot oil contained in the tube 1. Each adapter 23 is guided by but rests loosely within the hollow trunnion 15 so as not to rotate therewith and extends outwardly where through suitable oil-tight connections it is joined to a tubulure 24 communicating into the metal tubes 25. The tubes 25 and communicating tubulures 24 are well insulated from loss of heat either by use of insulating material or by surrounding them with evacuated jacket tubes. Thus are provided channels for the flow of hot oil to higher levels, as explained below, with small losses of temperature.

The tubes 25, closed at their lower ends, extend upwardly along the frame 13, see Figs. 1, 2, and 11, and are supported thereon by suitable brackets 26. The upper portions of the tubes 25 are bent towards the polar axis of the machine and continue on at first close together and parallel to said polar axis toward a constantly higher level.

Referring to Figures 1, 2, 11, 12 and 13, the close together parallel continuations of the tubes 25, which proceed upward at first substantially parallel to the continuation of the projected axis of the trunnions 27, hereinafter referred to, parallel with the axis of the earth, bend from that axis gradually while still rising, and afterwards bend sharply upward, then downward again parallel to the projected axis of the trunnions 27.

The orifices 28 at the end of the tubes 25 dip deeply into an oil bath 30 as shown in Figs. 11 and 12, or 31 as shown in Figure 13. The tubes 25 are provided with upper orifices 32 near the top level of the oil baths 30 or 31 which orifices are arranged to be opened and closed by a suitable valve 33, so arranged that when one of the orifices 32 is open the other orifice will be closed and vice versa. Obviously, each of the orifices 32 may be opened and closed by individual valves. The proximity of the tubes 25 to the projected axis of the trunnion 27, causes the upper orifices 32 of the tubes to remain almost stationary, except for a rotation about the axis of the trunnions 27. This slight rotation takes place when the frame 13 is moved to follow the daily march of the sun.

During forenoon hours, while the western side of the frame 13 is uppermost, the valve 33 is adjusted so that the western tube 25 discharges the oil through its upper orifice 32, but the eastern tube 25 discharges through its lower orifice. Thereby the hottest oil, rising through the western tube 25, empties into the higher levels of the oil baths 30 or 31, and the cooler oil from the bottom of said oil baths flows down through the eastern tube 25. During the afternoon hours these arrangements are reversed. A gravity circulation therefore continually tends to raise the temperature of the oil bath 30 or 31.

When the device is to be employed for cooking purposes, the oil bath 30 surrounds on five sides the oven 47. Thick heat-insulating material 48, is provided to hinder the cooling of the oil bath and enclosed oven.

When the device is to be employed for power purposes, a tubular steam boiler unit 50 may be inserted in the oil-bath 31, and connected to a steam engine, as in ordinary steam engineering practice.

It is also possible to immerse a grid of metal tubes similar to the tubes in the oil bath 31, and to suck or force therethrough fluids to be heated for any desired purposes.

In Figures 9 and 10 there is disclosed another form of ray-absorbing unit in which there is provided an inner tube 34, an intermediate tube 35, and an outer tube 36. The characteristics of these tubes are the same as those heretofore described in connection with the tubes 1, 2 and 3, shown in detail in Figures 4 and 5. Instead of providing the enlargements 4 of Figs. 4 and 5 to allow for differential expansion, there is attached to one end of the outer tube 36 a glass vessel 37, the inner walls of which contain a coating of silver or other medium having a bright surface. The inner tube 34, also metal-coated at this part, is bent within the vessel 37, as shown in Figure 9 to allow for expansion.

The end of the tube 34 adjacent the vessel 37 is suitably connected to a tubulure 41 which communicates with the metal tubes 25 heretofore described.

That end of the ray-absorbing unit of Figures 9 and 10 opposite the vessel 37 may be carried in a manner similar to that disclosed in connection with the unit of Figs. 4 and 5. In Figure 9 an adapter 42 surrounds the outer tube 36 and is affixed thereto, and fashioned in a way similar to the tubular adapters 23 of Figs. 4 and 5. Connections similar to those shown in Figs. 4 and 5 are made to the tubes 25 by tubulures 41ª.

The ray-reflecting unit 11 shown in Figure 10 is carried and rotated in a manner similar to that described in connection with Figure 7 where the reflector is shown as being carried on the end of a hollow trunnion which is adapted to be rotated by the worm and worm wheel arrangement shown in the several figures heretofore described. The adapter 42 is guided by but loosely mounted within the hollow trunnion so as not to rotate with it when adjustments of the reflector are made. The opposite end of the reflector is carried by a hollow trunnion 43 rotatably mounted in the frame 13. The outer tube 36 of the ray-absorbing unit passes through the trunnion 43 beyond the frame 13 where it is connected to the vessel 37.

In order to avoid breakage or fracture the vessel 37 is carried by a suitable support 44 attached to the frame 13. A cushioning medium 45 is preferably interposed between the support 44 and the vessel 37.

The tubulures 41 and 41ª communicate with the metallic tubes 25 heretofore described. In the structure shown in Figure 10 the tubes 25 may be supported by brackets 46 attached to the frame 13.

The frame 13, carrying the plurality of ray-collecting and ray-absorbing units heretofore described, carries trunnions 27, symmetrically situated upon its ends in a line at right angles to the axes of the ray-collectors 11. Said trunnions 27, rest upon roller bearings or other suitable supports 27ª, see Fig. 3, arranged to support the axis defined by said trunnions 27, to be parallel to the axis of the earth. This arrangement enables an attendant, first to set the frame 13 at right angles to the plane of the great circle of right ascension containing the celestial poles and the sun, and secondly to rotate all of the ray-collectors 11, simultaneously until the axes of their parabolic mirrors are in a plane containing the sun, whatever his declination with respect to the celestial equator. It is not necessary to alter these adjustments continuously as in a telescope which is driven by an astronomical clock. Intermittent adjustments by hand at intervals of an hour or thereabouts are sufficient to secure practically full efficiency of the device. Thus costly mechanism is avoided.

What I claim as my invention and desire to protect by Letters Patent is:

1. In a solar heater, the combination of a frame, a ray-collector and a ray-absorber containing an opaque liquid mounted on said frame, a support upon which the frame is rotatable about an axis parallel to the axis of the earth, said ray-collector and frame being movable to expose said ray-absorber to concentrated solar rays, a receptacle containing a bath of opaque liquid located above the frame, and liquid conducting tubes connected to the ray-absorber and projecting upwardly and entering the receptacle from above in a direction parallel to the axis of the earth and shaped for unobstructed rotation within the bath in a path parallel to said first mentioned axis upon the rotation of the frame.

2. In a solar heater, the combination of a frame, a ray-collector and a ray-absorber containing an opaque liquid mounted on said frame, a support upon which the frame is rotatable, said ray-collector and frame being movable to expose said ray-absorber to concentrated solar rays, a receptacle containing a bath of opaque liquid located above the frame, liquid conducting tubes connected to the ray-absorber and projecting upwardly and entering the receptacle from above in a direction parallel to the axis of the earth and shaped for unobstructed rotation within the bath in a path parallel to said axis upon rotation of the frame, and heat-insulating material surrounding said tubes and said receptacle and the medium to which heat is desired to be applied located in said bath.

3. In a solar heater, the combination of a frame, a ray-collector and a ray-absorber containing an opaque liquid mounted on said frame, a support upon which the frame is rotatable about an axis parallel to the axis of the earth, said ray-collector and frame being movable to expose said ray-absorber to concentrated solar rays, a receptacle containing a bath of opaque liquid located above the frame, liquid conducting tubes connected to the ray-absorber and projecting upwardly and entering the receptacle from above in a direction parallel to the axis of the earth and shaped for unobstructed rotation within the bath in a path parallel to the axis of rotation of the frame, and a grid of tubes located in said bath for absorbing heat therefrom.

4. A solar heater comprising a plurality of longitudinally extending ray-absorbers containing an opaque fluid, ray-collectors individual to the ray-absorbers, a frame supporting the ray-absorbers and ray-collectors, means for moving the ray-collectors with respect to the ray-absorbers, a support upon which the frame is rotatable about an axis parallel to the axis of the earth and at right angles to the axis of the ray-absorbers, a receptacle containing a bath of opaque fluid located above the frame, and fluid conducting tubes connected to the ray-absorbers and entering the receptacle from above in a direction parallel to the axis of the earth and shaped for unobstructed rotation within the bath in a path parallel to the axis of rotation of the frame.

5. In a solar heater, a ray-absorber comprising a plurality of coaxial tubes highly transparent to solar rays but highly opaque to long-wave rays, the inmost of said tubes being sealed to the outmost of said tubes and the space between them evacuated, and means for permitting a differential heat expansion between said tubes, said inmost tube being arranged to contain a fluid highly absorptive of solar radiation.

6. In a solar heater, a ray-absorber comprising a plurality of coaxial tubes highly transparent to solar rays, but highly opaque to long-wave rays, the inmost of said tubes being sealed to the outmost of said tubes and the space between them evacuated, and means comprising bellows-shaped enlargements of said inner tube for permitting a differential heat expansion between said tubes, said inmost tube being arranged to contain a fluid highly absorptive of solar radiation.

7. In a solar heater, a ray-collector comprising a parabolic cylindric mirror, a ray-absorber in the focus of said mirror comprising a plurality of coaxial tubes highly transparent to solar rays, but highly opaque to long-wave rays, the inmost of said tubes being sealed to the outmost of said tubes and the space between them evacuated, and means for rotating said mirror to adjust said focus, said inmost tube being arranged to contain a fluid highly absorptive of solar radiation.

8. In a solar heater, a ray-absorber comprising a plurality of coaxial tubes highly transparent to solar rays, but highly opaque to long-wave rays, the inmost of said tubes being sealed to the outmost of said tubes and the space between them evacuated, and an enlargement formed on the outer of said tubes for permitting a differential heat expansion between the said tubes, said inmost tube being arranged to contain a fluid highly absorptive of solar radiation.

9. In a solar heater, a ray-absorber comprising a plurality of coaxial tubes highly transparent to solar rays, but highly opaque to long-wave rays, the inmost of said tubes being sealed to the outmost of said tubes and the space between them evacuated, and an enlargement formed on the outer of said tubes and receiving the inner of said tubes for permitting a differential heat expansion between said tubes, said inmost tube being arranged to contain a fluid highly absorptive of solar radiation.

10. In a solar heater, a ray-collector comprising a parabolic cylindric mirror, a ray absorber in the focus of said mirror comprising a plurality of coaxial tubes highly transparent to solar rays, but highly opaque to long-wave rays, the inmost of said tubes being sealed to the outmost of said tubes and the space between them evacuated, an enlargement formed on the outer of said tubes and receiving the inner of said tubes for permitting a differential heat expansion between said tubes, and means for rotating said mirror to adjust said focus, said inmost tube being arranged to contain a fluid highly absorptive of solar radiation.

11. In a solar heater, a concave cylindric mirror, means whereby the principal focal plane of said mirror may be oriented to contain the sun's center, a body highly transparent to solar rays, but highly opaque to long-wave rays, said body comprising a plurality of coaxial tubes, the inner of said tubes lying in the principal focus of said mirror, the inmost of said tubes being sealed to the outmost of said tubes, and the space between them evacuated, means whereby a differential expansion between said inmost and said outmost tubes may be accommodated, and a channel connecting the extremities of said inmost tube, said inmost tube and channel constructed and arranged to contain a fluid highly absorptive of solar radiation.

12. In a solar heater, the combination of a frame, a ray collector comprising a parabolic cylindric mirror, a ray-absorber comprising a plurality of co-axial tubes highly transparent to solar rays, but highly opaque to long wave rays, the inmost of said tubes being sealed to the outmost of said tubes, and the space between them evacuated, said ray-absorber being located in the focus of said ray-collector mounted on said frame, means for rotating said ray-collector about an axis containing the focal line of said ray-collector, and a support for the frame and upon which said frame is rotatable about an axis parallel to the axis of the earth and at right angles to the axis of said ray-collector and ray-absorber.

13. In a solar heater, a ray-absorber comprising a plurality of co-axial tubes highly transparent to solar rays, but highly opaque to long wave rays, the inmost of said tubes being sealed to the outmost of said tubes and the space between them evacuated, a receptacle adapted to contain a fluid highly absorptive of solar radiation located above the ray-absorber, and conduits connected to opposite ends of the inmost of said tubes projecting upwardly and entering said receptacle for the transmission of said fluid to and from the inmost tube and the receptacle.

CHARLES GREELEY ABBOT.